(12) United States Patent
Yamamoto et al.

(10) Patent No.: US 8,544,621 B2
(45) Date of Patent: Oct. 1, 2013

(54) SHOCK ABSORBER

(75) Inventors: Satsuki Yamamoto, Aiko-gun (JP); Shinichi Kagawa, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 336 days.

(21) Appl. No.: 12/972,833

(22) Filed: Dec. 20, 2010

(65) Prior Publication Data

US 2011/0266105 A1 Nov. 3, 2011

(30) Foreign Application Priority Data

Apr. 28, 2010 (JP) ................................. 2010-104317

(51) Int. Cl.
*F16F 9/34* (2006.01)
(52) U.S. Cl.
USPC .............. 188/322.15; 188/322.22; 188/282.5
(58) Field of Classification Search
USPC ................. 188/322.15, 322.22, 262.6, 282.5, 188/282.8, 282.9
See application file for complete search history.

(56) References Cited

U.S. PATENT DOCUMENTS 4,460,074 A 7/1984 Müller et al.
6,371,264 B1 * 4/2002 Deferme .................. 188/322.15

FOREIGN PATENT DOCUMENTS

JP 57-137735 8/1982

* cited by examiner

*Primary Examiner* — Melanie Torres Williams
(74) *Attorney, Agent, or Firm* — Wenderoth, Lind & Ponack, LLP

(57) ABSTRACT

A shock absorber which facilitates an insertion/fixation operation. The shock absorber includes a spring-force application unit (84) for applying a force in a valve-closing direction to a disc valve while allowing the fixed shaft to be inserted therethrough; and a cylindrical member (47) for allowing the fixed shaft (21) to be inserted therethrough. The disc valve includes a plurality of valve discs (53) to (58). The cylindrical member is inserted into each of the valve discs (53) to (58) and the spring-force application unit (84), in which: the cylindrical member (47) is provided so as to have a radially extending gap on an inner side of the inner seat (31) of the valve main body (14).

10 Claims, 4 Drawing Sheets

SHOCK ABSORBER

BACKGROUND OF THE INVENTION

The present invention relates to a shock absorber.

There exists a shock absorber including a disc valve which opens and closes a passage through which a working fluid flows by the movement of a piston. In the above-mentioned shock absorber, the disc valve is biased by spring means (for example, see Japanese Patent Application Publication No. 57-137735 A).

SUMMARY OF THE INVENTION

In the shock absorber described above, the assembly (insertion/fixation) of a component for biasing the disc valve in a valve-closing direction is complicated.

In view of the above-mentioned problem, the present invention has an object to provide a shock absorber which facilitates an assembling operation.

In order to achieve the above-mentioned object, the present invention has configuration which includes: a spring-force application means for applying a force in a valve-closing direction to the disc valve while allowing the fixed shaft to be inserted through the spring-force application means; and a cylindrical member for allowing the fixed shaft to be inserted through the cylindrical member, the cylindrical member being inserted into each of the disc valve and the spring-force application means, in which: the cylindrical member is provided so as to have a radially extending gap on an inner side of the inner seat of the valve main body.

DETAILED DESCRIPTION OF THE INVENTION

Hereinafter, an embodiment of the present invention is described referring to the accompanying drawings.

Figure 1:
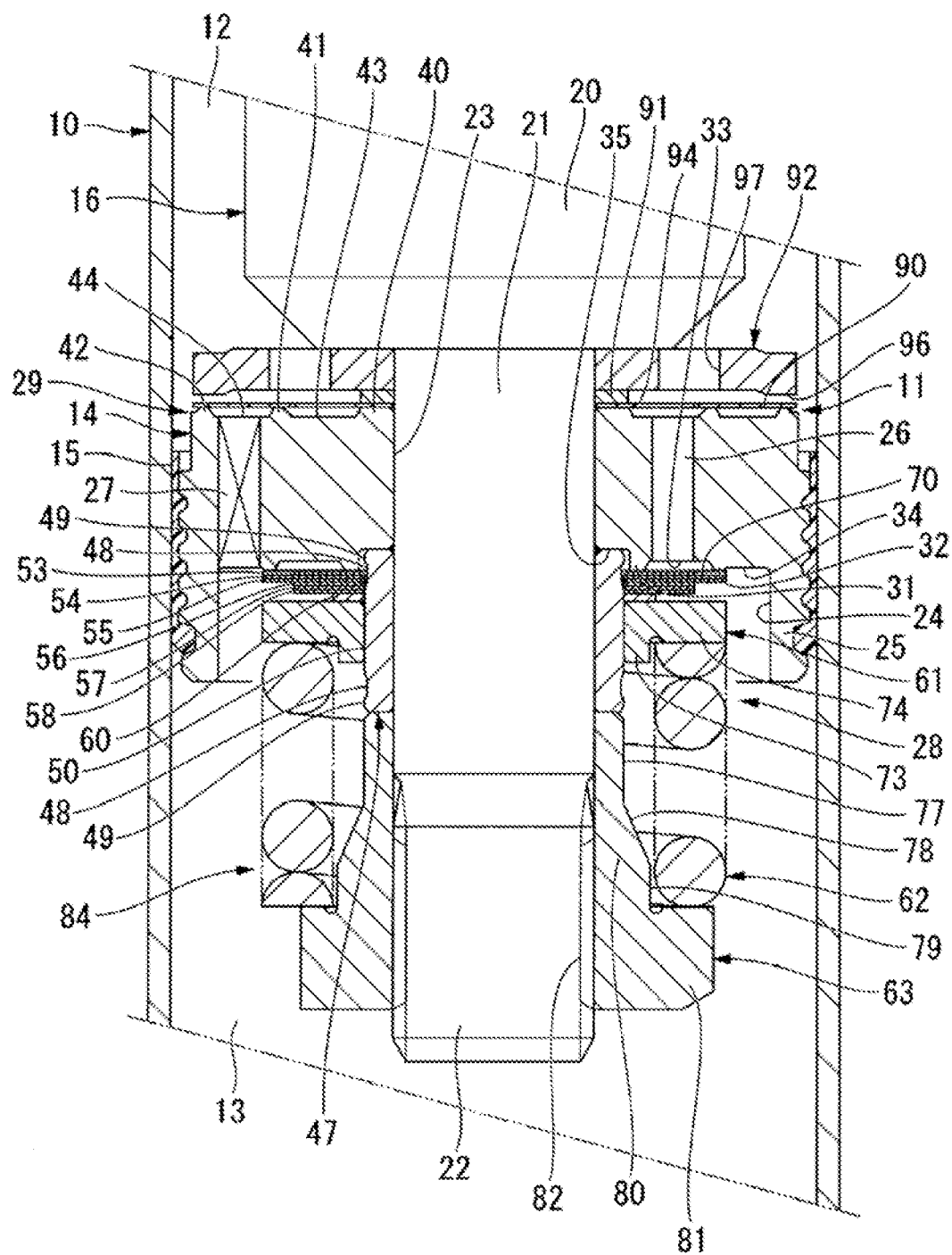
FIG. 1 is a sectional view illustrating a principal part of a shock absorber according to an embodiment of the present invention.

A shock absorber of this embodiment is a so-called monotube hydraulic shock absorber as illustrated in FIG. 1. The shock absorber includes a cylinder 10 having an approximately cylindrical shape, in which an oil fluid corresponding to a working fluid is enclosed. A piston 11 is slidably inserted into the cylinder 10. The interior of the cylinder 10 is partitioned into two chambers, i.e., an upper chamber 12 and a lower chamber 13 by the piston 11.

The piston 11 includes a piston main body (valve main body) 14 having an approximately disc-like shape and an annular sliding member 15. The sliding member 15 is mounted on an outer circumferential surface of the piston main body 14. The piston main body 14 is connected to one end of a piston rod 16. The other end of the piston rod 16 projects outside the cylinder 10 (not shown).

The piston rod 16 includes a main shaft portion 20, an inserted shaft portion (fixed shaft) 21, and a threaded shaft portion 22. The inserted shaft portion 21 has a smaller diameter than that of the main shaft 20 and is provided to an end of the main shaft portion 20 on the side where the piston 11 is mounted. The threaded shaft portion 22 is provided on the side of the inserted shaft portion 21, which is opposite to the side where the main shaft portion 20 is provided.

In the center of the piston main body 14, an insertion hole (valve main body insertion hole) 23, through which the inserted shaft portion 21 of the piston rod 16 is to be inserted, is formed so as to axially pass through the piston main body 14. A housing concave portion 24 having a larger inner diameter than the diameter of the insertion hole 23, which is axially concaved to an intermediate position, is formed on one axial end of the piston main body 14. The housing concave portion 24 is formed on the inner side of a ring-like wall portion 25 which is coaxial with the insertion hole 23. The insertion of the inserted shaft portion 21 into the through hole 23 radially positions the piston main body 14 with respect to the piston rod 16.

A plurality of passages 26 (hereinafter, the passage is referred to "passage," "inner passage," or "extension-side passage") are formed through the piston main body 14 on the radially outer side of the insertion hole 23 inside the housing concave portion 24. In FIG. 1, only one thereof is illustrated because of limitations as a cross section. The inner passages 26 bring the upper chamber 12 and the lower chamber 13 into communication with each other to allow the oil fluid to flow from the upper chamber 12 to the lower chamber 13 during the sliding movement of the piston 11 toward the upper chamber 12, that is, during an extension stroke. Moreover, a plurality of passages 27 (hereinafter, the passage is referred to "passage," "outer passage," or "compression-side passage") are formed through the piston main body 14 on the radially outer side of the inner passages 26 inside the housing concave portion 24. In FIG. 1, only one thereof is illustrated because of limitations as a cross section. The outer passages 27 bring the upper chamber 12 and the lower chamber 13 into communication with each other to allow the oil fluid to flow from the lower chamber 13 to the upper chamber 12 during the sliding movement of the piston 11 toward the lower chamber 13, that is, during a contraction stroke.

A damping-force generating mechanism 28 for generating a damping force is provided to the inner passages 26. The damping-force generating mechanism 28 is provided on the side of the piston 11, which is close to the lower chamber 13 in the axial direction. The inner passages 26 constitute extension-side passages through which the oil fluid passes when the piston 11 moves to the extension side, toward which the piston rod 16 extends outside the cylinder 10. The damping-force generating mechanism 28 provided to the extension-side passages 26 constitutes an extension-side damping-force generating mechanism which controls the flow of the oil fluid through the extension-side passages 26 to generate the damping force.

A damping-force generating mechanism 29 for generating a damping force is provided to the outer passages 27. The damping-force generating mechanism 29 is provided on the side of the piston 11, which is close to the upper chamber 12 in the axial direction. The outer passages 27 constitute compression-side passages through which the oil fluid passes when the piston 11 moves to the compression side, toward which the piston rod 16 moves into the cylinder 10. The damping-force generating mechanism 29 provided to the compression-side passages 27 constitutes a compression-side damping-force generating mechanism which controls the flow of the oil fluid through the compression-side passages 27 to generate the damping force.

An inner seat 31 constituting the above-mentioned damping-force generating mechanism 28 is formed on the housing concave portion 24 of the piston main body 14. The inner seat 31 is provided on the radially inner side of open ends of the extension-side passages 26, the open ends being located on the lower chamber 13 side. The inner seat 31 is formed to project in the axial direction of the piston main body 14. The inner seat 31 is formed to have a ring-like shape around the insertion hole 23, more specifically, to have an annular shape having the insertion hole 23 as a center. The inner seat 31 projects in the axial direction of the piston main body 14 to have a given height over the entire circumference.

Moreover, an outer seat 32 constituting the above-mentioned damping-force generating mechanism 28 is also formed on the housing concave portion 24 of the piston main body 14. The outer seat 32 is provided on the radially outer side of the open ends of the extension-side passages 26, the open ends being located on the lower chamber 13 side. The outer seat 32 is formed to project in the axial direction of the piston main body 14. The outer seat 32 has a larger diameter than that of the inner seat 31 and is formed to have a ring-like shape on the outer circumferential side of the inner seat 31 so as to surround all the openings of the plurality of passages 26 on the extension side. More specifically, the outer seat 32 is formed to have an annular shape having the insertion hole 23 as a center. Note that, the cuter seat 32 may also have a ring-like shape other than the annular shape, for example, in a petal-like pattern with a large-diameter portion and a small-diameter portion arranged alternately, an ellipsoidal shape or the like.

The outer seat 32 projects in the axial direction of the piston main body 14 to have a given height over the entire circumference. The outer seat 32 has a larger height in the axial direction toward the lower chamber 13 than that of the inner seat 31. The axial projections of the inner seat 31 and the outer seat 32 form a ring-like concave portion 33 having an annular shape, which is concaved in the axial direction of the piston main body 14, between the inner seat 31 and the outer seat 32. In addition, a ring-like concave portion 34 having an annular shape, which is concaved in the axial direction of the piston main body 14, is formed between the outer seat 32 and the ring-like wall portion 25. The open ends of the extension-side passages 26 on the lower chamber 13 side are open on a bottom surface of the ring-like concave portion 33 located on the inner side, whereas the open ends of the compression-side passages 27 on the lower chamber 13 side are open on a bottom surface of the ring-like concave portion 34 located on the outer side.

An abutment concave portion 35 which is concaved in the axial direction of the piston main body 14 is formed on the housing concave portion 24 of the piston main body 14. The abutment concave portion 35 is located on the radially outer side of the insertion hole 23 and on the radially inner side of the inner seat 31, that is, on the side of the inner seat 31, which is radially close to the insertion hole 23. The abutment concave portion 35 is formed on the inner side of the inner seat 31 to have a ring-like shape, specifically, in an annular shape having the insertion hole 23 as a center. The ring-like concave portion 33 is concaved to the upper chamber 12 side to have a larger, depth than that of the ring-like concave portion 34 in the axial direction of the piston main body 14, and the abutment concave portion 35 is concaved to the upper chamber 12 side to have a further larger depth than that of the ring-like concave portion 33 in the axial direction of the piston main body 14.

A mount seat 40 is formed on an end of the piston main body 14, which is on the upper chamber 12 side. The mount seat 40 is formed so as to project in the axial direction of the piston main body 14 on the radially outer side of the insertion hole 23. The mount seat 40 is formed to have an annular shape having the insertion hole 23 as center and projects in the axial direction of the piston main body 14 to have a given height over the entire circumference.

An inner seat 41 constituting the above-mentioned damping-force generating mechanism 29 is formed on the end of the piston main body 14, which is on the upper chamber 12 side. The inner seat 41 is formed on the radially outer side of the mount seat 40 and the radially inner side of the open ends of the compression-side passages 27, the open ends being close to the upper chamber 12, so as to project in the axial direction of the piston main body 14. The inner seat 41 has a larger diameter than that of the mount seat 40 and is formed to have a ring-like shape around the insertion hole 23, specifically, an annular shape having the insertion hole 23 as a center. The inner seat 41 projects in the axial direction of the piston main body 14 to have a given height over the entire circumference.

Moreover, an outer seat 42 constituting the above-mentioned damping-force generating mechanism 29 is formed on the end of the piston main body 14, which is on the upper chamber 12 side. The outer seat 42 is formed on the radially outer side of the open ends of the compression-side passages 27, the open ends being close to the upper chamber 12, so as to project in the axial direction of the piston main body 14. The outer seat 42 has a larger diameter than that of the inner seat 41 and is formed to have a ring-like shape on the outer circumferential side of the inner seat 41 so as to surround all the openings of the plurality of compression-side passages 27, specifically, in an annular shape having the insertion hole 23 as a center. Note that, the outer seat 42 may have a ring-like shape other than the annular shape, for example, in a petal-like pattern with a large-diameter portion and a small-diameter portion arranged alternately, an ellipsoidal shape, or the like.

In the axial direction of the piston main body 14, the mount seat 40, the inner seat 41, and the outer seat 42 project to the same level. The projections of the mount seat 40, the inner seat 41, and the outer seat 42 in the axial direction of the piston main body 14 form a ring-like concave portion 43 and a ring-like concave portion 44. The ring-like concave portion 43 has an annular shape concaved in the axial direction of the piston main body 14 toward the lower chamber 13 and is formed between the mount seat 42 and the inner seat 41, whereas the ring-like concave portion 44 has an annular shape concaved in the axial direction of the piston main body 14 toward the lower chamber 13 and is formed between the inner seat 41 and the outer seat 42. The open ends of the extension-side passages 26 on the upper chamber 12 side are open on a bottom surface of the inner ring-like concave portion 43, whereas the open ends of the contraction-side passages 27 on the upper chamber 12 side are open on a bottom surface of the outer ring-like concave portion 44. Note that, a plurality of passage grooves (not shown) which are concaved in the axial direction of the piston main body 14 toward the lower chamber 13 are formed on the outer seat 42 so as to radially pass therethrough. The outer seat 42 projects in the axial direction of the piston main body 14 toward the upper chamber 12 to have a given height except for the passage grooves.

A cylindrical member 47 is provided on the lower chamber 13 side of the piston main body 14 so as to allow the inserted shaft portion 21 of the piston rod 16 to be inserted therethrough. The insertion of the inserted shaft portion 21 through the cylindrical member 47 radially positions the cylindrical member 47 with respect to the piston rod 16. Radially concaved engagement grooves 48 are formed on an outer circumferential portion of the cylindrical member 47 on two circumferential ends of the cylindrical member 47 in the axial direction so that each of the engagement grooves 48 is formed in an annular shape coaxial with the cylindrical member 47. As a result, an annular flange portion 49, which projects radially outward, is provided to the cylindrical member 47 so as to be formed on the axially outer side of each of the engagement grooves 48 formed on the two circumferential ends of the cylindrical member 47. Between the two engagement grooves 48, an annular sliding-movement guiding portion (large-diameter portion) 50 having a larger diameter than that of each of the engagement grooves 48 is formed. Cylindrical outer circumferential surfaces of the two flange portions 49 and the sliding-movement guiding portion 50 have the same diameter. In addition, the two engagement grooves 48 have the same diameter. The flange portions 49 may be interruptedly formed in the circumferential direction instead of being formed in the annular shape continuous in the circumferential direction.

Figure 2:
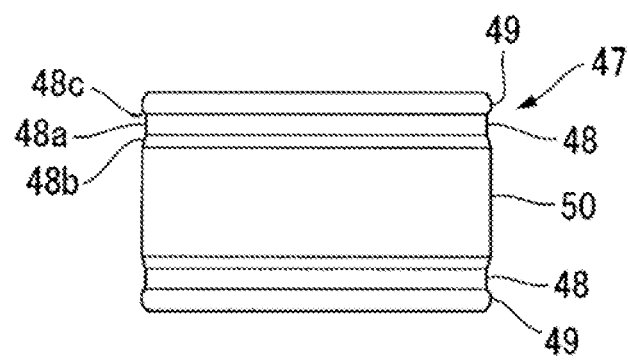
FIG. 2 is a side view illustrating a cylindrical member of the shock absorber according to the embodiment of the present invention.

As illustrated in FIG. 2, each of the engagement grooves 48 includes a groove bottom surface 48a, a tapered surface 48b, and a curved surface 48c. The groove bottom surface 48a has a cylindrical surface shape. The tapered surface 48b is formed on the side of the groove bottom surface 48a, which is close to the sliding-movement guiding portion 50, and connects the groove bottom surface 48a and an outer circumferential surface of the sliding-movement guiding portion 50 to each other. The curved surface 48c is formed on the side of the groove bottom surface 48a, which is opposite to the side where the sliding-movement guiding portion 50 is formed, and connects the groove bottom surface 48a and the outer circumferential surface of one of the flange portions 49, which is adjacent thereto, to each other. The tapered surface 48b on the sliding-movement guiding portion 50 side is gently inclined.

As illustrated in FIG. 1, each of the flange portions 49 has a smaller diameter than an inner diameter of an inner circumferential surface of the abutment concave portion 35 of the piston main body 14. Therefore, the cylindrical member 47 moves into the abutment concave portion 35 of the piston main body 14 to abut against the bottom surface of the abutment concave portion 35. Specifically, the cylindrical member 47 is provided with a radially extending gap on the inner side of the inner seat 31 which forms the circumferential wall surface of the abutment concave portion 35 of the piston main body 14. The cylindrical member 47 and the piston main body 14 are radially positioned by the inserted shaft portion 21. As a result, the gap between the cylindrical member 47 and the circumferential wall surface of the abutment concave portion 35 becomes continuous over the entire circumference of the cylindrical member 47. In other words, the cylindrical member 47 has a clearance so as to allow free movement of the cylindrical member 47 in the radial direction with respect to the abutment concave portion 35. The formation of one of the engagement grooves 48 and one of the flange portions 49 on the outer circumference of the cylindrical member 47 on the piston main body 14 side corresponding to one side in the axial direction is sufficient. In this embodiment, however, another pair of the engagement portion 48 and the flange portion (second flange portion) 49 are formed on the cylindrical member 47 on the opposite side in the axial direction so as to eliminate the limitation of orientation at the time of insertion/fixation to improve operability in insertion/fixation.

An axial length of each of the flange portions 49 is smaller than an axial depth of the abutment concave portion 35. Therefore, the curved portion 48c of each of the engagement grooves 48 illustrated in FIG. 2 is positioned closer to the piston main body 14 in the axial direction than the inner seat 31 illustrated in FIG. 1. Specifically, the groove bottom surface 48a of the upper one of the engagement grooves 48 illustrated in FIG. 1 is axially aligned with a distal end surface of the inner seat 31. Moreover, a distal end surface of the outer seat 32 is axially aligned with the groove bottom surface 48a of the upper one of the engagement grooves 48 illustrated in FIG. 1.

The damping-force generating mechanism 28 includes a disc valve which can seat simultaneously on the inner seat 31 and the outer seat 32. The disc valve includes, in this embodiment, a plurality of valve discs 53 to 58 each having a ring-shape. The damping-force generating mechanism 28 further includes a ring-like spacer 60, and a ring-like movable spring-locking member 61, a spring 62, and a fixed spring-locking member 63. The ring-like spacer 60 is provided on the side of the valve discs 53 to 58, which is opposite to the side where the piston main body 14 is located. The movable spring-locking member 61 is provided on the side of the spacer 60, which is opposite to the side where the piston main body 14 is located. The spring 62 is provided on the side of the movable spring-locking member 61, which is opposite to the side where the piston main body 14 is located. The fixed spring-locking member 63 is provided on the side of the spring 62, which is opposite to the side where the piston main body 14 is located.

Figure 3:
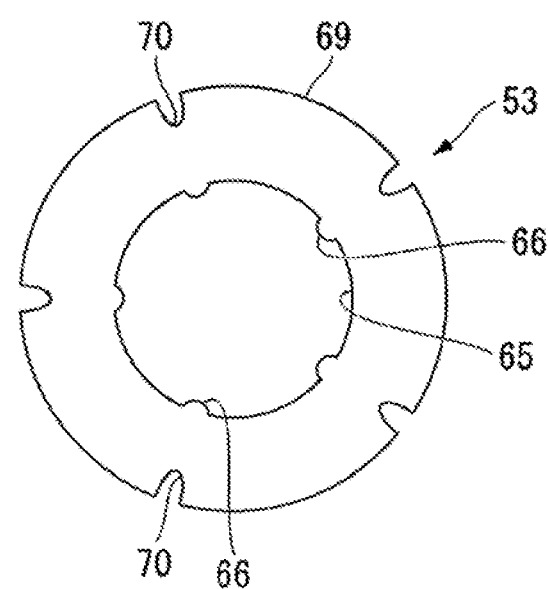
FIG. 3 is a plan view illustrating one of valve discs of the shock absorber according to the embodiment of the present invention.

The valve disc 53, which is axially the closest of all the valve discs 53 to 58 to the piston main body 14 and can come into contact with and separate from the inner seat 31 and the outer seat 32, has an annular shape. As illustrated in FIG. 3, on the inner diameter side, the valve disc 53 has an inner-diameter portion 65 and a plurality of arc-like convex portions 66. The inner-diameter portion 65 has a circumferential shape with a given diameter. Each of the arc-like convex portions 66 is a partial projection extending radially inward from the inner diameter portion 65. The plurality of convex portions 66 are equiangularly provided to the valve disc 53 so as to be provided at four or more positions (in the illustrated example, five). The inner-diameter portion 65 has a smaller diameter than that of the inner seat 31 illustrated in FIG. 1, that is, a smaller diameter than that of the circumferential wall surface of the abutment concave portion 35.

The valve disc 53 is fitted over the cylindrical member 47. An inner diameter of the inner-diameter portion 65 of the valve disc 53 is slightly larger than those of the flange portions 49 and the sliding-movement guiding portion 50 of the cylindrical member 47. An inner diameter of a circle passing through the tops of the plurality of convex portions 66, which corresponds to the smallest diameter (hereinafter, the circle obtained by connecting the tops of the convex portions 66 is referred to as "smallest diameter portion") on the inner circumference of the valve disc 53 is smaller than that of the largest diameter portion of each of the flange portions 49 and is slightly larger than that of each of the engagement grooves 48. In other words, the largest diameter portion of each of the flange portions 49 has a larger diameter than that of the smallest diameter portion of the inner circumference of the valve disc 53 which is the closest of the plurality of valve discs 53 to 58 to the piston main body 14.

Figure 4:
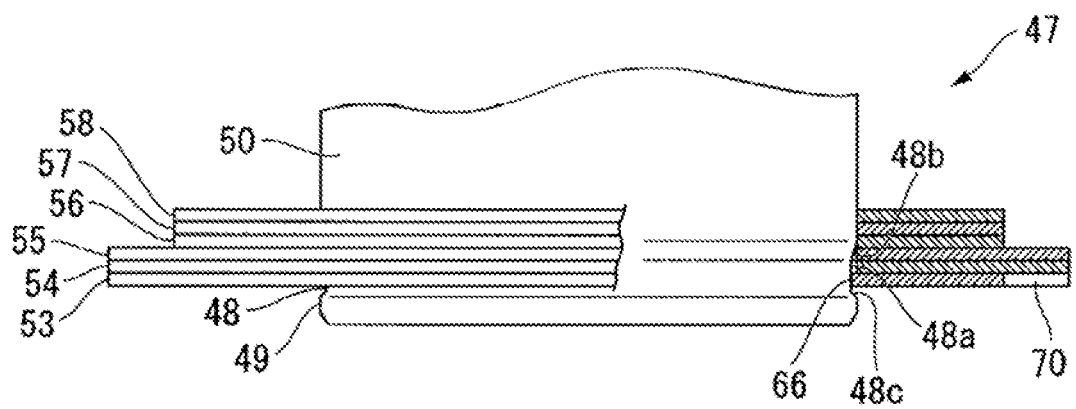
FIG. 4 is a partially enlarged view illustrating the cylindrical member and the disc valves of the shock absorber according to the embodiment of the present invention, which are partially shown in cross section.

The inserted shaft portion 21 of the piston rod 16 is inserted through the valve disc 53. In addition, the valve disc 53 is fitted over the cylindrical member 47. When the valve disc 53 is fitted over the cylindrical member 47, the plurality of convex portions 66 are elastically deformed by one of the flange portions 49. When the convex portions 66 moves to the position of one of the engagement grooves 48 (the upper one of the engagement grooves 48 illustrated in FIG. 1), the plurality of convex portions 66 elastically recover to fit into the one of the engagement grooves 48, as illustrated in FIG. 4. In this manner, the plurality of convex portions 66 are engaged with the engagement groove 48, and hence the valve disc 53 is radially positioned with respect to the cylindrical member 47. In this state, owing to a difference in diameter between an inscribed circle formed by the plurality of convex portions 66, and the flange portions 49 and the sliding-movement guiding portion 50, it is difficult for the valve disc 53 to move outside the engagement groove 48 into which the valve disc 53 is fitted. Therefore, the valve disc 53 is prevented from being removed from the cylindrical member 47.

As illustrated in FIG. 3, the valve disc 53 has an outer-diameter portion 69 and a plurality of notch portions 70 equiangularly provided in a circumferential direction on the outer diameter side. The outer-diameter portion 69 has a circumferential shape with a given diameter. Each of the notch portions 70 is partially concaved radially inward from the outer-diameter portion 69 to form an arc-like shape. The outer-diameter portion 69 has an outer diameter of the valve disc 53 as the largest diameter thereof and has a larger diameter than an outer diameter of the outer seat 32 illustrated in FIG. 1. An inscribed circle formed by bottom portions of the plurality of notch portions 70 has a smaller diameter than the inner diameter of the outer seat 32. In this manner, even when the valve disc 53 abuts against the outer seat 32, the passages 26 are brought into communication with the lower chamber 13. While the valve disc 53 abuts against the outer seat 32, flow paths (orifices), each having a small flow-path area, are formed between the valve disc 53 and the notch portions 70 to bring the passages 26 into communication with the lower chamber 13. On the other hand, when the valve disc 53 separates from the outer seat 32, the passages 26 are opened to bring the passages 26 into communication with the lower chamber 13 with a larger flow-path area than that of the orifices described above.

As illustrated in FIG. 4, the valve disc 54 which abuts against the valve disc 53 and the valve disc 55 which abuts against the valve disc 54 have the same annular shape. The valve discs 54 and 55 serve to apply a biasing force to the valve disc 53 in a valve-closing direction. On the inner diameter side, each of the valve discs 54 and 55 has the same diameter as that of the inner-diameter portion 65 of the valve disc 53 and has a circumferential shape with a given diameter over the entire circumference. On the other hand, on the outer diameter side, each of the valve discs 54 and 55 has the same diameter as that of the outer-diameter portion 69 of the valve disc 53 and has a circumferential shape with a given diameter over the entire circumference. The inserted shaft portion 21 of the piston rod 16 and the cylindrical member 47 provided over the inserted shaft portion 21 are inserted through the valve discs 54 and 55. In other words, the valve discs 54 and 55 are fitted over the cylindrical member 47.

The valve disc 56 which abuts against the valve disc 55, the valve disc 57 which abuts against the valve disc 56, and the valve disc 58 which abuts against the valve disc 57 have the same annular shape. The valve discs 56 to 58 serve to apply a biasing force to the valve disc 53 in the valve-closing direction. On the inner-diameter side, each of the valve discs 56 to 58 has the same inner diameter as those of the valve discs 54 and 55 and has a circumferential shape with a given diameter over the entire circumference. On the outer-diameter side, each of the valve discs 56 to 58 has a smaller diameter than those of the valve discs 54 and 55 and has a circumferential shape with a given diameter over the entire circumference. The inserted shaft portion 21 of the piston rod 16 and the cylindrical member 47 provided over the inserted shaft portion 21 are inserted through the valve discs 56 to 58. In other words, the valve discs 56 to 58 are fitted onto the cylindrical member 47.

The spacer 60 illustrated in FIG. 1 which abuts against the valve disc 58 has an annular shape. On the inner-diameter side, the spacer 60 has the same inner diameter as those of the valve discs 56 to 58 and has a circumferential shape with a given diameter over the entire circumference. On the outer-diameter side, the spacer 60 has a smaller outer diameter than those of the valve discs 56 to 58 and has a circumferential shape with a given diameter over the entire circumference. Moreover, the spacer 60 is formed to have a larger thickness than those of the valve discs 53 to 58. The inserted shaft portion 21 of the piston rod 16 and the cylindrical member 47 provided over the inserted shaft portion 21 are inserted through the spacer 60. As a result, the spacer 60 is radially positioned with respect to the cylindrical member 47 and the piston rod 16.

The movable spring-locking member 61 which can abut against the spacer 60 described above has an annular shape. The movable spring-locking member 61 has a cylindrical portion 73 and a locking flange portion 74. The locking flange portion 74 extends radially outward from one axial end of the cylindrical portion 73 to form an annular shape. The inserted shaft portion 21 of the piston rod 16 and the cylindrical member 47 provided over the inserted shaft portion 21 are inserted through the movable spring-locking member 61. At the time of insertion, the movable spring-locking member 61 is retained so as to be slidable on the sliding-movement guiding portion 50 of the cylindrical portion 47. As a result, the movable spring-locking member 61 is axially movable while being radially positioned with respect to the piston rod 16. In other words, the cylindrical member 47 is inserted into the movable spring-locking member 61. The sliding-movement guiding portion 50, on which the movable spring-locking member 61 slides, is provided to the cylindrical member 47 on the side of one of the flange portions 49 close to the piston main body 14, the side being axially opposite to the side where the piston main body 14 is located. The abutment of the valve disc 58 against the movable spring-locking member 61 allows the prevention of the deformation of the valve discs 53 to 58 in a valve-opening direction beyond a defined level.

The fixed spring-locking member 63 includes a stepped cylindrical portion 80 and a Locking flange portion 81. The stepped cylindrical portion 80 includes a small-diameter cylindrical surface 77, a tapered surface 78, and a large-diameter cylindrical surface 79. The small-diameter cylindrical surface 77 has a given diameter. The tapered surface 78 has a diameter which increases as separating in the axial direction from the small-diameter cylindrical surface 77. The large-diameter cylindrical surface 79 is located on the side of the tapered surface 78, which is opposite to the side where the small-diameter cylindrical surface 77 is located, and has a given diameter which is larger than that of the small-diameter cylindrical surface 77. The locking flange portion 81 extends radially outward from an end of the stepped cylindrical portion 80, which is on the large-diameter cylindrical surface 79 side in the axial direction, to form an annular shape. An internal thread 82 is formed on an inner circumferential portion of the stepped cylindrical portion 80, which is on the locking flange portion 81 side in the axial direction. The fixed spring-locking member 63 is threadably engaged with the threaded shaft portion 22 of the piston rod 16 by the internal thread 82 while the inserted shaft portion 21 of the piston rod 16 is inserted into the fixed spring-locking member 63 on the side of the stepped cylindrical portion 80, which is axially opposite to the side where the locking flange portion 81 is provided. In this state, one end of the fixed spring-locking member 63 in the axial direction abuts against one end of the cylindrical member 47 in the axial direction so that the fixed spring-locking member 63 presses the other end of the cylindrical member 47 in the axial direction against the piston main body 14. Specifically, the fixed spring-locking member 63 has a function as a nut for retaining the cylindrical member 47 between the fixed spring-locking member 63 and the piston main body 14.

A spring 62 consisting of a compression coil spring is interposed between the locking flange portion 74 of the movable spring-locking member 61 and the locking flange portion 81 of the fixed spring-locking member 63, through which the inserted shaft portion 21 of the piston rod 16 is inserted. A biasing force of the spring 62 is transmitted to the valve discs 53 to 58 through an intermediation of the movable spring-locking member 61 and the spacer 60. The movable spring-locking member 61, the spring 62, and the fixed spring-locking member 63 constitute a spring-force application mechanism (spring-force application means) 84 for applying a force in the valve-closing direction to the valve discs 53 to 58 independently of the force applied by the valve discs 53 to 58. Note that, a level difference is provided so that the height of the outer seat 32 in the axial direction of the piston main body 14 toward the lower chamber 13 is larger than that of the inner seat 31. Therefore, when the valve discs 53 to 58 are pressed by the biasing force of the spring 62 through an intermediation of the movable spring-locking member 61 and the spacer 60, the valve disc 53, which abuts against the inner seat 31 and the outer seat 32 to be brought into close contact therewith, is slightly deflected so that the outer circumferential side thereof is positioned closer to the spring 62 in the axial direction of the piston main body 14 than the inner circumferential side thereof. Hence, the valve disc 54 which abuts against the valve disc 53 and the valve disc 55 which abuts against the valve disc 54 are also deflected as in the case of the valve disc 53. As a result, the valve discs 54 to 55 bias the valve disc 53 to bring the valve disc 53 into close contact with the outer seat 32.

The damping-force generating mechanism 29 includes a ring-like disc valve 90, a ring-like spacer 91, and a ring-like valve restricting member 92. The disc valve 90 can seat simultaneously on the inner seat 41 and the outer seat 42. The spacer 91 is provided on the side of the disc valve 90, which is opposite to the side where the piston main body 14 is located. The valve restricting member 92 is provided on the side of the spacer 91, which opposite to the side where the piston main body 14 is located.

The disc valve 90, which can come into and separate from the inner seat 41 and the outer seat 42, has an annular shape. On the inner diameter side, the disc valve 90 has a circumferential shape with a given diameter which is smaller than those of the inner seat 41 and the mount seat 40. On the outer diameter side, the disc valve 90 has a circumferential shape with a given diameter which is larger than that of the outer seat 42. Through holes 94 are formed between the inner seat 41 and the mount seat 40 so as to axially pass through the disc valve 90. The through holes 94 bring the passages 26 into communication with the upper chamber 12. The inserted shaft portion 21 of the piston rod 16 is inserted through the disc valve 90. As a result, the disc valve 90 is radially positioned with respect to the piston rod 16. The disc valve 90 forms a flow path (orifice) having a small flow-path area with the passage grooves (not shown) formed on the outer seat 42 while abutting against the outer seat 42 so as to bring the passages 27 into communication with the upper chamber 12. On the other hand, when the disc valve 90 separates from the outer seat 42, the passages 27 are opened so as to be brought into communication with the upper chamber 12 with a larger flow-path area than that of the orifice.

A spacer 91 which abuts against the disc valve 90 has an annular shape. On the inner diameter side, the spacer 91 has the same inner diameter as that of the disc valve 90 and forms a circumferential shape with a given diameter over the entire circumference. On the outer diameter side, the spacer 91 has a smaller outer diameter than the diameter of the through holes 94 of the disc valve 90 and forms a circumferential shape with a given diameter over the entire circumference. The spacer 91 is formed to have a larger thickness than that of the disc valve 90. The inserted shaft portion 21 of the piston rod 16 is inserted through the spacer 91. As a result, the spacer 91 is radially positioned with respect to the piston rod 16.

The valve restricting member 92 which abuts against the spacer 91 has an annular shape. On the inner diameter side, the valve restricting member 92 has the same inner diameter as that of the spacer 91 and forms a circumferential shape with a given diameter over the entire circumference. On the outer diameter side, the valve restricting member 92 has the same outer diameter as that of the disc valve 90 and forms a circumferential shape with a given diameter over the entire circumference. Moreover, the valve restricting member 92 is formed to have a larger thickness than that of the spacer 91. The inserted shaft portion 21 of the piston rod 16 is inserted through the valve restricting member 92. As a result, the valve restricting member 92 is radially positioned with respect to the piston rod 16. An annular level-difference portion 96 which forms a slight level difference so as to be located on the piston main body 14 side in the axial direction is formed on the outer circumferential portion of the valve restricting member 92. Through holes 97 are formed at the positions which are on the radially inner side of the level-difference portion 96 of the valve restricting member 92 so as to axially pass through the valve restricting member 92. The through holes 97 constantly bring the passages 26 into communication with the upper chamber 12 through the through holes 94 of the disc valve 90. The separation of the disc valve 90 from the outer seat 42 brings the passages 27 into communication with the upper chamber 12 through a radially extending gap between the disc valve 90 and the piston 11. At this time, the valve restricting member 92 restricts the deformation of the disc valve 90 in the valve-opening direction beyond a defined level.

For assembling the piston 11 and the damping-force generating mechanisms 28 and 29 to the piston rod 16, the valve restricting member 92, the spacer 91, the disc valve 90, and the piston 11 (including the sliding member 15 previously mounted on the piston main body 14) are stacked in this order on an end surface of the main shaft portion 20, which is on the inserted shaft portion 21 side, while the threaded shaft portion 22 and the inserted shaft portion 21 are inserted in the state in which the threaded shaft portion 22 of the piston rod 16 is pointed at an upper end, for example. On the other hand, independently of the above-mentioned procedure, the valve disc 53 is fitted over the cylindrical member 47 from one side in the axial direction so as to be fitted into one of the engagement grooves 48, which is on one side in the axial direction. While the threaded shaft portion 22 and the inserted shaft portion 21 are inserted through the cylindrical member 47, the cylindrical member 47 is located in the abutment concave portion 35 of the piston 11. Next, the valve discs 54 to 58, the spacer 60, the movable spring-locking member 61, and the spring 62 are stacked in this order on the valve disc 53 while the cylindrical member 47 is inserted therethrough. Thereafter, the fixed spring-locking member 63 is threadably engaged with the threaded shaft portion 22. Note that, at the time of the engagement of the valve disc 53 with the cylindrical member 47, which is performed independently, the valve discs 54 to 58, the spacer 60, and the movable spring-locking member 61 may be previously stacked in this order. The piston rod 21 may be inserted through the set of the above-mentioned elements so that the set of the above-mentioned elements is placed on the piston 11.

As a result, the valve restricting member 92, the spacer 91, the disc valve 90, the piston 11, and the cylindrical member 47 are interposed between the end surface of the main shaft portion 20, which is on the inserted shaft portion 21 side, and an end surface of the fixed spring-locking member 63, which is on the side opposite to the locking flange portion 81 of the stepped cylindrical portion 80 so as to be fixed to the piston rod 16 integrally therewith. Consequently, the fixed spring-locking member 63 itself is fixed to the piston rod 16 integrally therewith. Moreover, the valve discs 53 to 58, the spacer 60, the movable spring-locking member 61, and the spring 62 are retained between the locking flange portion 81 of the fixed spring-locking member 63 and the piston 11.

Figure 5:
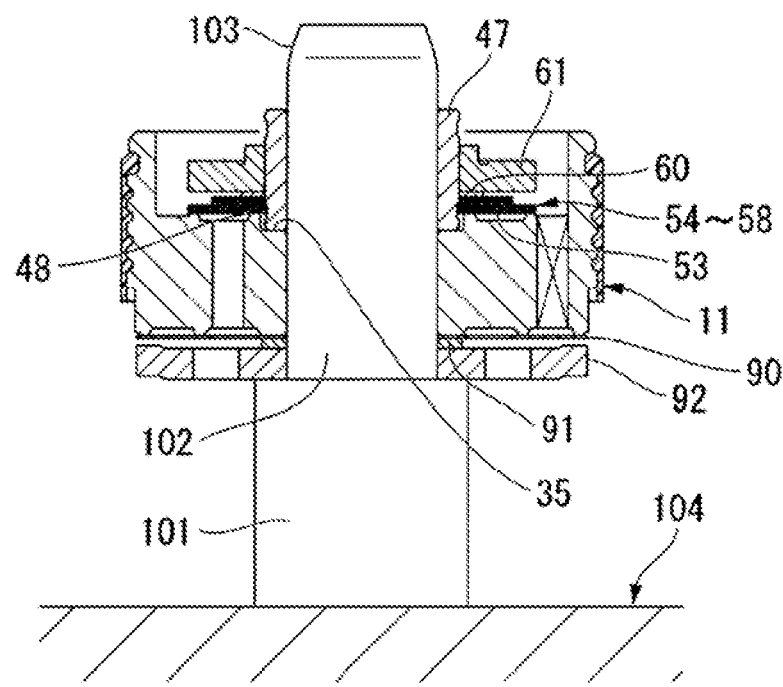
FIG. 5 is a sectional view illustrating a state of the shock absorber according to the embodiment of the present invention at the time of fixation/insertion.

Alternatively, as illustrated in FIG. 5, a temporary fixing jig 104 is prepared. The temporary fixing jig 104 includes a large-diameter shaft portion 101, an inserted shaft portion 102, and a tapered shaft portion 103. The large-diameter shaft portion 101 is formed in a lower part of the temporary fixing jig 104. In a middle part of the temporary fixing jig 104, the inserted shaft portion 102 having a smaller diameter than that of the large-diameter shaft portion 101 and the same diameter as that of the inserted shaft portion 21 is formed. The tapered shaft portion 103, which is tapered off to a point, is formed at an upper end of the temporary fixing jig 104. The valve restricting member 92, the spacer 91, the disc valve 90, and the piston 11 are stacked in this order on an end surface of the large-diameter shaft portion 101 on the inserted shaft portion 102 side while the tapered shaft portion 103 and the inserted shaft portion 102 are being inserted through the above-mentioned stacked elements. On the other hand, the valve disc 53 is fitted over the outer side of the cylindrical member 47 from one side in the axial direction to be fitted into one of the engagement grooves 48, which is on one side in the axial direction. The cylindrical member 47 is placed in the abutment concave portion 35 of the piston 11 while the inserted shaft portion 102 is being inserted into the cylindrical member 47. Next, the valve discs 54 to 58, the spacer 60, and the movable spring-locking member 61 are stacked in this order on the valve disc 53 while the cylindrical member 47 is being inserted through the above-mentioned elements. Thereafter, the set of the above-mentioned elements is removed from the temporary fixing jig 104. Then, the set of the elements is directly placed on the end surface of the main shaft portion 20 on the inserted shaft portion 21 side while the threaded shaft portion 22 and the inserted shaft portion 21 of the piston rod 16, which are retained so that the threaded shaft portion 22 is positioned at the upped end, are being inserted through the set of elements. Next, after the spring 62 is placed on the movable spring-Locking member 61, the fixed spring-locking member 63 is threadably engaged with the threaded shaft portion 22. Note that, even in this case, the valve discs 53 to 58, the spacer 60, and the movable spring-locking member 61 may be previously fixed to the cylindrical member 47 so that a set of the elements obtained by the fixation may be placed on the piston 11 while the piston rod 21 is being inserted therethrough.

Figure 6:
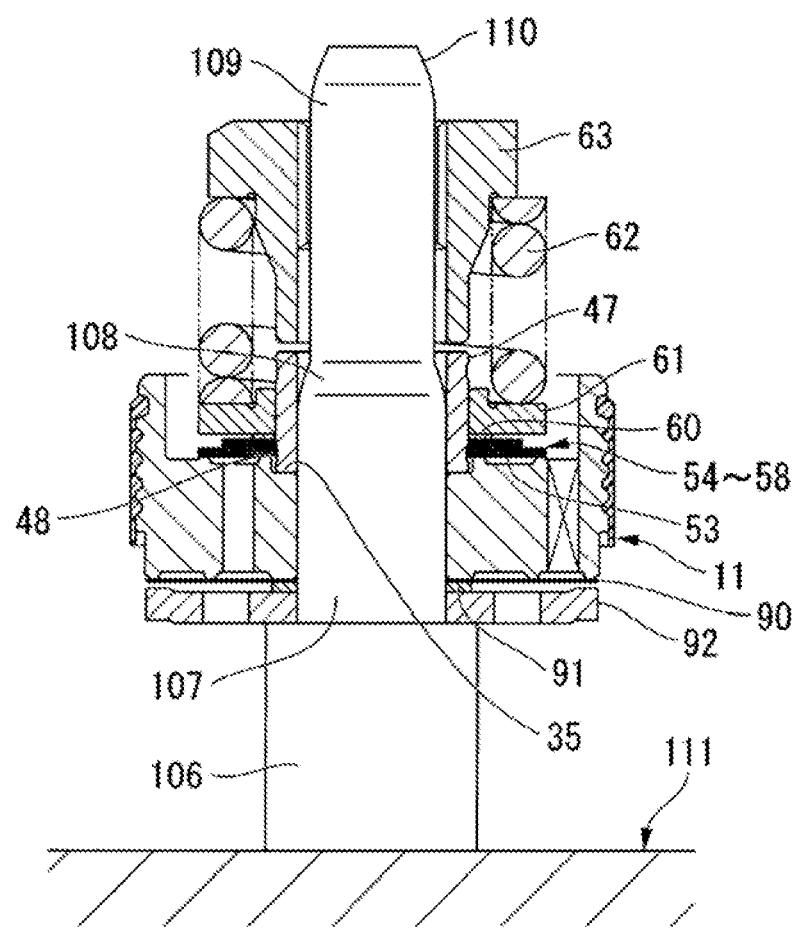
FIG. 6 is another sectional view illustrating a state of the shock absorber according to the embodiment of the present invention at the time of fixation/insertion.

Further alternatively, as illustrated in FIG. 6, a temporary fixing jig 111 is prepared. The temporary fixing jig 111 includes a large-diameter shaft portion 106, an inserted shaft portion 107, a tapered shaft portion 108, an inserted shaft portion 109, and a tapered shaft portion 110. The large-diameter shaft portion 106 is formed in a lower part of the temporary fixing jig 111. In a lower middle part of the temporary fixing jig 111, the inserted shaft portion 107 having a smaller diameter than that of the large-diameter shaft portion 106 and the same diameter as that of the inserted shaft portion 21 is formed. The tapered shaft portion 108 is formed in an intermediate middle part of the temporary fixing jig 111. The inserted shaft portion 109 having a slightly smaller diameter than the smallest diameter of the internal thread 82 of the fixed spring-locking member 63 is formed in an upper middle part of the temporary fixing jig 111. The tapered shaft portion 110, which is tapered off to a point, is formed at an upped end of the temporary fixing jig 111. The valve restricting member 92, the spacer 91, the disc valve 90, and the piston 11 are stacked in this order on an end surface of the large-diameter shaft portion 106 on the inserted shaft portion 107 side while the tapered shaft portion 110, the inserted shaft portion 109, the tapered shaft portion 108, and the inserted shaft portion 107 are being inserted through the above-mentioned stacked elements. On the other hand, independently of the procedure described above, the valve disc 53 is fitted over the outer side of the cylindrical member 47 from one side in the axial direction so as to be engaged with one of the engagement grooves 48, which is on one side in the axial direction. The cylindrical member 47 is placed in the abutment concave portion 35 of the piston 11 while the tapered shaft portion 110, the inserted shaft portion 109, the tapered shaft portion 108, and the inserted shaft portion 107 are being inserted into the cylindrical member 47. Next, the valve discs 54 to 58, the spacer 60, the movable spring-locking member 61, the spring 62, and the fixed spring-locking member 63 are stacked in this order on the valve disc 53 while the cylindrical member 47 is being inserted through the above-mentioned stacked elements. Thereafter, a set of the above-mentioned elements is removed from the temporary fixing jig 111. Then, the set of elements is directly placed on the end surface of the main shaft portion 20 on the inserted shaft portion 21 side while the threaded shaft portion 22 and the inserted shaft portion 21 of the piston rod 16, which are retained so that the threaded shaft portion 22 is positioned at the upper end, are being inserted through the set of elements. Next, after the spring 62 is placed on the movable spring-locking member 61, the fixed spring-locking member 63 is threadably engaged with the threaded shaft portion 22. Note that, even in this case, the valve discs 53 to 58, the spacer 60, and the movable spring-locking member 61 may be previously combined with the cylindrical member 47 so that a set of the elements obtained by the fixation may be placed on the piston 11 while the piston rod 21 is being inserted therethrough.

Here, during the extension stroke in which the piston rod 16 moves to the extension side, the oil fluid flows from the upper chamber 12 into the lower chamber 13 through the passages 26. When a speed of the piston (hereinafter, referred to as "piston speed" is within a super-low speed range, the oil fluid introduced from the upper chamber 12 into the passages 26 basically flows into the low chamber 13 through the constant orifices formed by the outer seat 32 formed on the piston 11 and the notch portions 70 of the valve disc 53 which abuts against the outer seat 32. At the time of the flow of the oil fluid, a damping force having an orifice characteristic (damping force substantially proportional to a square of the piston speed) is generated.

Moreover, when the piston speed increases to reach a low speed range, the oil fluid introduced from the upper chamber 12 into the passages 26 has a high pressure at the position where the oil fluid flows out toward the valve discs 53 to 58. As a result, the oil fluid basically passes between the valve disc 53 and the outer seat 32 to flow into the lower chamber 13 while starting deforming the valve discs 53 to 58 at the outer circumferential portion of the spacer 60 as a starting point. Therefore, the damping force having a valve characteristic (damping force substantially proportional to the piston speed) is generated.

Moreover, when the piston speed further increases, the oil fluid introduced from the upper chamber 12 to the passages 26 has a further increased pressure at the position where the oil fluid flows out toward the valve discs 53 to 58. When the pressure of the oil fluid exceeds a reaction force of the spring 62, the spring 62 is compressed. While separating the valve discs 53 to 58, the spacer 60, and the movable spring-locking member 61 from the outer seat 32 and the inner seat 31, the oil fluid passes between the valve disc 53 and the outer seat 32 to flow into the lower chamber 13. Therefore, a damping force having a characteristic of the passages 26 (damping force substantially proportional to the piston speed with a smaller gradient than that of the valve characteristic described above) is generated. Note that, at this time, the axial length of the groove bottom surface 48a is set so that the valve disc 53 moves within the range of the groove bottom surface 48a of the corresponding one of the engagement grooves 48 without being removed from the corresponding one of the engagement grooves 48. Moreover, the axial length of the sliding-movement guiding portion 50 is set so that the movable spring-locking member 61 moves within the range of the sliding-movement guiding portion 50 of the cylindrical member 47.

During a contraction stroke in which the piston rod 16 moves toward the compression side, the oil fluid flows from the lower chamber 13 to the upper chamber 12 through the passages 27. When the piston speed is within the super-low speed range, the oil fluid introduced from the lower chamber 13 into the passages 27 basically flows into the upper chamber 12 through the constant orifice formed by the passage grooves (not shown) formed on the outer seat 42 of the piston 11 and the disc valve 90 which abuts against the outer seat 42. At this time, a damping force having the orifice characteristic (damping force substantially proportional to the square of the piston speed) is generated.

Moreover, when the piston speed increases to reach the low speed range, the oil fluid introduced from the lower chamber 13 into the passages 27 basically passes between the disc valve 90 and the outer seat 42 to flow into the upper chamber 12 while opening the disc valve 90. Therefore, a damping force having the valve characteristic (damping force substantially proportional to the piston speed) is generated.

In the shock absorber described in JP 57-137735 A cited above, a member inserted into a disc valve and a spring force application means for biasing the disc valve in a valve-closing direction, through which a piston rod is inserted, is threadably engaged with the piston rod. Therefore, insertion/fixation becomes complicated.

On the other hand, according to the embodiment described above, the cylindrical member 47, which is inserted into the valve discs 53 to 58 and the spring-force application mechanism 84, allows the piston rod 16 to pass therethrough without threadable engagement of the piston rod 16. Thus, the insertion/fixation operation can be facilitated.

Moreover, if the cylindrical member, which is inserted into the disc valves and the spring force application means, is pressed to be fitted into the inner seat of the piston main body, a pressing operation is complicated. In addition, there is a possibility of distorting a seat surface of the inner seat due to pressing. Furthermore, if the cylindrical member cannot be pressed normally, the following problems occurs. For example, the piston main body, in particular, the inner seat is damaged. If the cylindrical member is fitted obliquely, the disc valves cannot preferably seat on the inner seat and the outer seat to cause a leakage of the oil fluid. In addition, the disc valves cannot move preferably.

On the other hand, according to this embodiment described above, the cylindrical member 47, which is inserted into the valve discs 53 to 58 and the spring-force application mechanism 84, is provided with the radially extending gap provided on the inner side of the inner seat 31 of the piston main body 14. Therefore, the pressing is not required, thereby facilitating the assembly (insertion/fixation) operation. In addition, the above-mentioned problems due to abnormal pressing can be prevented from occurring.

The flange portions 49 are formed on the outer circumference of the cylindrical member 47 on the piston main body 14 side. The largest diameter portion of each of the flange portions 49 is larger than the smallest diameter portion of the inner circumference of the valve disc 53 which is the closest of the valve discs 53 to 58 to the piston main body 14. Therefore, the valve disc 53 can be prevented from being removed from the cylindrical member 47. Because of the structure in which the cylindrical member 47 is provided with the radially extending gap provided on the inner side of the inner seat 31 of the piston main body 14, the cylindrical member 47 sometimes moves relative to the piston main body 14 during the insertion/fixation operation. Even in such conditions, the valve disc 53 and the valve discs 54 to 58 stacked thereon can be prevented from being removed from the cylindrical member 47. Unless the above-mentioned structure for preventing the removal of the valve disc 53 from the cylindrical member 47 is employed, the cylindrical member 47 moves relative to the piston main body 14 during the insertion/fixation operation described above, and hence the valve discs 53 to 58 placed on the piston main body 14 are disadvantageously removed from the cylindrical member 47. Then, there is a fear in that any of the valve discs 53 to 58 is stuck between the cylindrical member 47 and the piston main body 14. If the fixed spring-locking member 63 is threadably engaged with the piston rod 16 without noticing the thus stuck valve disc, there is a fear in that the stuck valve disc may be deformed or damaged. In this embodiment, such a problem does not occur.

On the cylindrical member 47, the flange portions 49 are formed on the axially opposite sides thereof. Therefore, the limit of orientation at the time of insertion/fixation is eliminated to prevent erroneous insertion/fixation. As a result, operability in the insertion/fixation operation is improved.

The cylindrical member 47 includes the sliding-movement guiding portion 50 on which the movable spring-locking member 61 of the spring-force application mechanism 84 slides, which is provided on the opposite side of the upper flange portion 49 from the piston main body 14. Therefore, the movement of the movable spring-locking member 61 is preferably allowed.

The smallest diameter portion of the inner circumference of the valve disc 53, which is the closest of the valve discs 53 to 58 to the piston main body 14, are formed by the plurality of convex portions 66 corresponding to partial projections formed on the circumferential inner diameter portion 65. Therefore, the valve disc 53 can preferably pass over the corresponding one of the flange portions 49 to be engaged with the corresponding one of the engagement grooves 48, into which the valve disc 53 is fitted. Thus, the operability in the insertion/fixation operation is improved. Note that, each of the engagement grooves 48 is not required to have the annular shape and may be a groove interruptedly formed in the circumferential direction, which is concaved so as to correspond to the positions of the convex portions 66.

By providing at least four convex portions 66, the valve disc 53 can be axially moved while the inclination thereof is suitably restricted. Moreover, the valve disc 53 can be prevented from being removed from the corresponding one of the engagement grooves 48, into which the valve disc 53 is fitted.

The formation of the inner seat 31 on the piston main body 14 eliminates the need of a member for controlling initial deflection of the valve discs 53 to 58. At the same time, a variation in initial deflection of the valve discs 53 to 58 can be restrained because a height of the inner seat 31 is stabilized.

Note that, although the application of the present invention to the damping-force generating mechanism 28 provided to the piston 11 of the shock absorber has been described above as an example, any damping-force generating mechanism provided to the shock absorber can be used regardless of whether the damping-force generating mechanism is a single cylinder type one or a multi-cylinder type one. The present invention is also applicable to other various damping-force generating mechanisms such as a base valve provided between a reservoir chamber formed between an internal cylinder and an external cylinder and a lower chamber inside the internal cylinder in the multi-cylinder type cylinder.

According to the embodiment as described above, a shock absorber has configuration which includes: a cylinder in which a working fluid is enclosed; a piston slidably inserted into the cylinder to partition interior of the cylinder into two chambers; a piston rod connected to the piston, the piston rod having at least one end projecting outside the cylinder; a valve main body having a passage through which the working fluid flows by sliding movement of the piston; a fixed shaft inserted through a valve main body insertion hole formed through the valve main body; an inner seat having a ring-shape provided around the valve main body insertion hole so as to project from the valve main body insertion hole; an outer seat having a ring-shape, provided on an outer circumferential side of the inner seat so as to project from the outer circumferential side of the inner seat and surround one opening of the passage; disc valve having a ring-shape capable of coming into contact with and separating from the inner seat and the outer seat, disc valve being for allowing the fixed shaft to pass through disc valve; spring-force application means for allowing the fixed shaft to be inserted through the spring-force application means to apply a force in a valve-closing direction to the disc valve; and a cylindrical member for allowing the fixed shaft to be inserted through the cylindrical member, the cylindrical member being inserted into the disc valve and the spring-force application means, in which: the cylindrical member is provided so as to have a radially extending gap on an inner side of the inner seat of the valve main body. As described above, the cylindrical member, which is inserted into the disc valve and the spring force application means, has a structure for allowing the fixed shaft to be inserted therethrough.

Therefore, the assembly can be facilitated. In addition, the cylindrical member has a structure which is provided with the radially extending gap provided on the inner side of the inner seat of the valve main body. Therefore, the pressing is not required, thereby facilitating the insertion/fixation operation. As a result, the problems due to abnormal pressing do not occur.

Moreover, the disc valve comprises a plurality of valve discs, and the flange portion is formed on the outer circumference of the cylindrical member on the valve main body side. The largest diameter portion of the flange portion has a larger diameter than that of the smallest diameter portion of the inner circumference of the valve disc, which is the closest of the plurality of valve discs to the valve main body. Therefore, even if the cylindrical member is unexpectedly moved relative to the valve main body during the insertion/fixation operation, the valve disc can be prevented from being removed from the cylindrical member. As described above, it is more preferred to form the flange portion on the outer circumference of the cylindrical member on the valve main body side. However, even if the flange portion is not formed on the cylindrical member, in other words, if the cylindrical member is straight in the axial direction without any processing, the pressing not required. Therefore, the problem of complication in the insertion/fixation operation with the pressing can be eliminated. When the flange portion is provided to the cylindrical member, the insertion/fixation operation can be further facilitated.

Moreover, the second flange portion is formed on the cylindrical member on the side axially opposite to the side where the flange portion is provided. Therefore, the limitation of orientation for the insertion/fixation is eliminated to prevent erroneous insertion/fixation. As a result, the operability in the insertion/fixation operation is improved.

Moreover, the large-diameter portion on which the spring force application means slides is provided to the cylindrical member on the side axially opposite to the side where the flange portion is provided. Therefore, the spring force application means can be suitably moved.

Moreover, the smallest diameter portion of the inner circumference of the valve disc, which is the closest of the plurality of valve discs to the valve main body, is formed by the plurality of convex portions which partially project from the circumferential inner diameter portion. Therefore, the valve disc can easily pass over the flange portion. Accordingly, the operability in the insertion/fixation operation is improved.

Moreover, at least four convex portions are provided. Therefore, the valve disc can be axially moved while the inclination thereof is restricted suitably. Moreover, the valve disc can be prevented from being removed from the flange portion.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-104317, filed on Apr. 28, 2010. The entire disclosure of Japanese Patent Application No. 2010-104317, filed on Apr. 28, 2010 including specification, claims, drawings and summary is incorporated herein by reference in its entirety.

What is claimed is:

1. A shock absorber comprising:

a cylinder in which a working fluid is enclosed;

a piston slidably inserted into the cylinder to partition an interior of the cylinder into two chambers;

a piston rod connected to the piston, the piston rod having at least one end projecting outside the cylinder;

a valve main body having a passage through which the working fluid flows by sliding movement of the piston;

a fixed shaft inserted through a valve main body insertion hole formed through the valve main body;

an inner seat having a ring-shape, the inner seat being provided around the valve main body insertion hole so as to project from the valve main body insertion hole;

an outer seat having a ring-shape, the outer seat being provided on an outer circumferential side of the inner seat so as to project from the outer circumferential side of the inner seat and surround one opening of the passage;

a disc valve having a ring-shape capable of coming into contact with and separating from the inner seat and the outer seat, the fixed shaft passing through the disc valve;

spring-force application means for applying a force in a valve-closing direction to the disc valve, the fixed shaft being inserted through the spring-force application means; and a cylindrical member inserted into the disc valve and the spring-force application means, the fixed shaft being inserted through the cylindrical member, wherein the cylindrical member is provided so as to have a radially extending gap on an inner side of the inner seat of the valve main body, wherein the disc valve comprises a plurality of valve discs, wherein the shock absorber further includes a flange portion formed on an outer circumference of the cylindrical member on a side close to the valve main body, and wherein a largest diameter portion of the flange portion has a larger diameter than that of a smallest diameter portion of an inner circumference of one of the plurality of the valve discs, the one of the plurality of the valve discs being closest to the valve main body.

2. A shock absorber according to claim 1, wherein the cylindrical member includes a second flange portion formed on the cylindrical member on a side axially opposite to the side where the valve main body is provided.

3. A shock absorber according to claim 1, wherein the cylindrical member includes a large-diameter portion, on which the spring-force application means slides, provided on a side axially opposite to the side where the valve main body is provided.

4. A shock absorber according to claim 2, wherein the cylindrical member includes a large-diameter portion, on which the spring-force application means slides, provided on a side axially opposite to the side where the valve main body is provided.

5. A shock absorber according to claim 1, wherein the smallest diameter portion of the inner circumference of the one of the plurality of the valve discs is formed by a plurality of convex portions corresponding to partial projections extending from a cylindrical inner-diameter portion.

6. A shock absorber according to claim 2, wherein the smallest diameter portion of the inner circumference of the one of the plurality of the valve discs is formed by a plurality of convex portions corresponding to partial projections extending from a cylindrical inner-diameter portion.

7. A shock absorber according to claim 3, wherein the smallest diameter portion of the inner circumference of the one of the plurality of the valve discs is formed by a plurality of convex portions corresponding to partial projections extending from a cylindrical inner-diameter portion.

8. A shock absorber according to claim 5, wherein the number of the convex portions is at least four.

9. A shock absorber according to claim 6, wherein the number of the convex portions is at least four.

10. A shock absorber to claim 5, wherein the plurality of the convex portions is an odd number of the convex portions.

* * * * *